United States Patent
Bakx et al.

(10) Patent No.: US 6,785,196 B2
(45) Date of Patent: Aug. 31, 2004

(54) DEVICE AND METHOD FOR RECORDING INFORMATION ON A TRACK HAVING PREFORMED POSITION INFORMATION

(75) Inventors: Johannus Leopoldus Bakx, Eindhoven (NL); Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/128,835

(22) Filed: Apr. 24, 2002

(65) Prior Publication Data

US 2003/0012088 A1 Jan. 16, 2003

(30) Foreign Application Priority Data

Apr. 24, 2001 (EP) .............................................. 01201480
Feb. 21, 2002 (EP) .............................................. 02075706

(51) Int. Cl.$^7$ .............................................. G11B 21/08
(52) U.S. Cl. .............................. 369/30.07; 369/30.04; 369/275.3
(58) Field of Search ........................ 369/30.05, 30.04, 369/30.07, 47.54, 30.11, 32.01, 275.3; 386/102, 125, 126

(56) References Cited

U.S. PATENT DOCUMENTS

| | | | |
|---|---|---|---|
| 5,124,966 A | 6/1992 | Roth et al. ..................... | 369/47 |
| 5,293,566 A | 3/1994 | Satoh et al. ................... | 369/49 |
| 5,341,356 A | 8/1994 | Dieleman et al. ............. | 369/47 |
| 6,167,012 A | * 12/2000 | Van Den Enden et al. | 369/47.1 |
| 6,359,844 B1 | * 3/2002 | Frank ...................... | 369/32.01 |
| 6,549,489 B1 | * 4/2003 | Van Der Enden et al. ............ | 369/30.11 |

FOREIGN PATENT DOCUMENTS

| | | | |
|---|---|---|---|
| JP | 2000-187967 A | * 7/2000 | .............. 369/30.11 |
| WO | WO9816014 | 4/1998 | |

OTHER PUBLICATIONS

ECMA standard Information and Communication Systems, Standards ECMA–267 3$^{rd}$ Edition—Apr. 2001, 120 mm DVD–Read–Only Disc–(1997).

ECMA–267;120 mm DVD– Read only Disc, 3$^{rd}$ Edition, Apr. 2001.

* cited by examiner

Primary Examiner—Tan Dinh

(57) ABSTRACT

A method and device for recording information blocks on a record carrier is described. The device has control means 20 for recording and retrieving position data indicative of the position of the recorded information blocks. The control means include a mapping unit 31 for determining in which region the information block is recorded and a detection unit 32. The region is one of a number of consecutive regions constituting the recordable area. The mapping unit records a random signal unit in a unit location in a mapping area. The unit location indicates said region, and the unit length of the random signal unit is smaller then the length of said information block. The detection unit 32 detects the presence of the recorded random signal units in said mapping area and so determines if a region contains at least one information block. The highest written address is found by detecting the highest written unit location in the mapping area, and subsequently searching said region for the presence of recorded marks.

10 Claims, 15 Drawing Sheets

Figure 3:
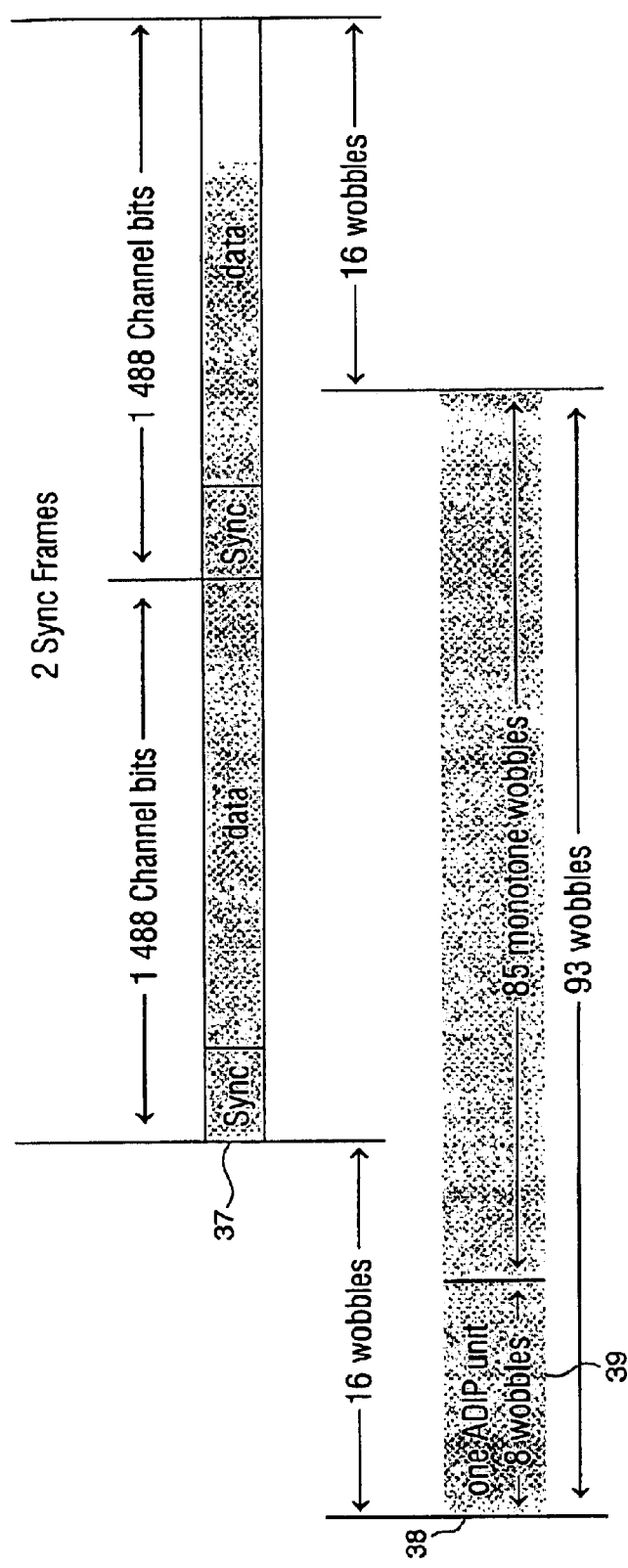

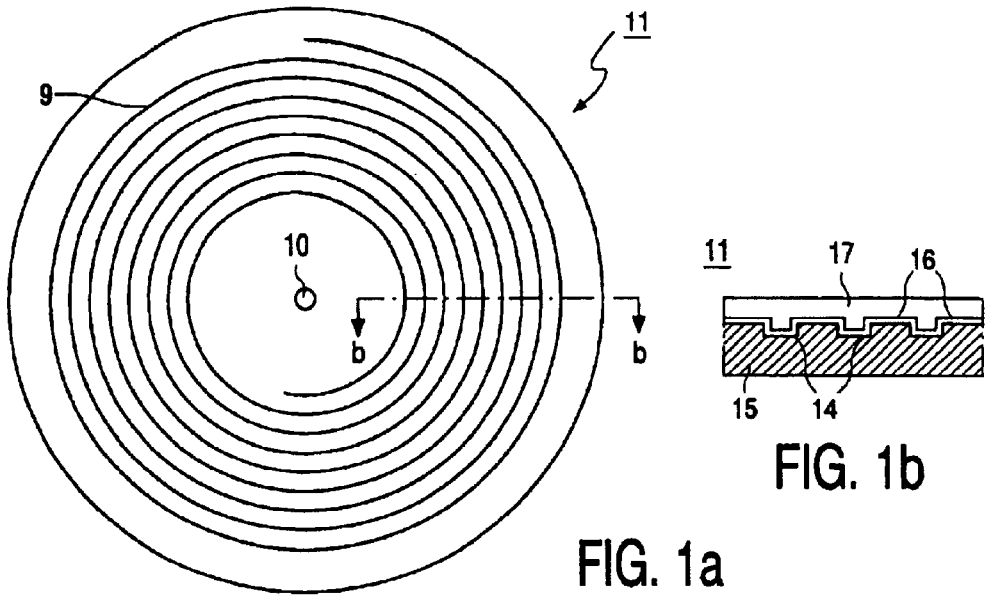
FIG. 1a
FIG. 1b
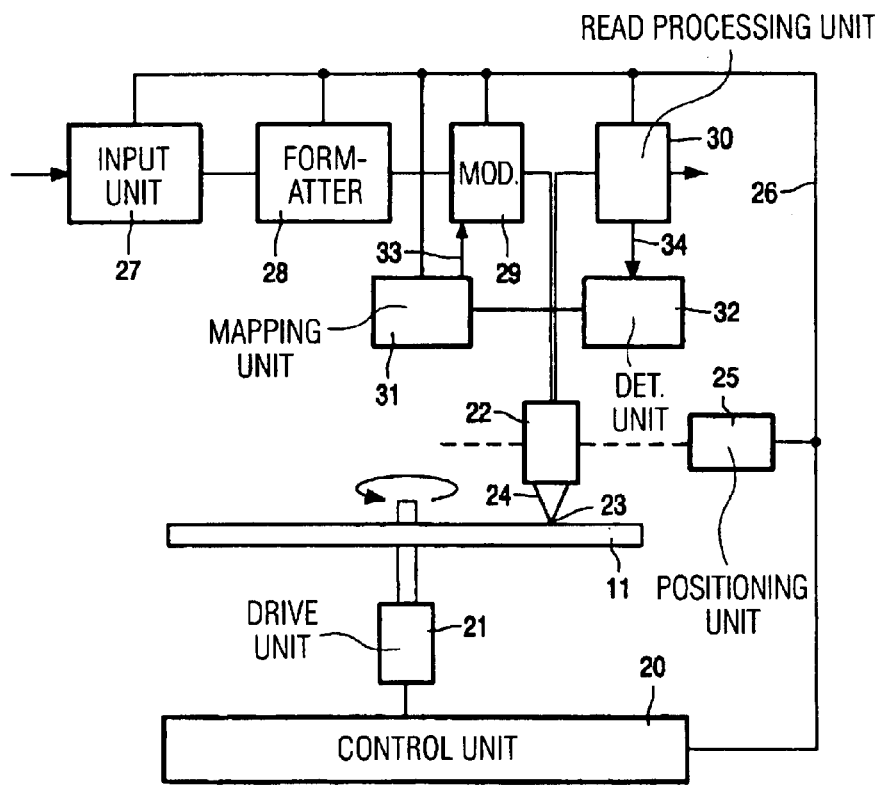
FIG. 2

| | bit 0 | bit 1 | bit 2 | bit 3 | ↑ | |
|---|---|---|---|---|---|---|
| nibble N₀ | | | | | | |
| nibble N₁ | bit 4 | bit 5 | .. | .. | 6 nibbles | ADIP address |
| .. | .. | .. | .. | .. | | |
| .. | bit 20 | .. | .. | bit 23 | ↓ | |
| nibble N₇ | bit 24 | .. | .. | .. | ↑ 2 nibbles | AUX data |
| nibble N₈ | bit 28 | .. | .. | bit 31 | ↓ | |
| | bit 32 | .. | .. | .. | ↑ | |
| .. | .. | .. | .. | .. | | Nibble based R-S ECC |
| .. | bit 48 | bit 49 | bit 50 | .. | 5 nibbles | |
| nibble N₁₂ | | | | bit 51 | ↓ | |

FIG.5

| Byte number | Content | Number of bytes |
|---|---|---|
| 0 | Disc Category and Version Number | 1 |
| 1 | Disc size | 1 |
| 2 | Disc structure | 1 |
| 3 | Recording density | 1 |
| 4 to 15 | Data Zone allocation | 12 |
| 16 | Set to (00) | 1 |
| 17 to 18 | Reserved – All (00) | 2 |
| 19 to 26 | Disc Manufacturer ID | 8 |
| 27 to 29 | Media type ID | 3 |
| 30 | Product revision number | 1 |
| 31 | number of Physical format information bytes in use | 1 |
| 32 | Reference recording velocity | 1 |
| 33 | Maximum recording velocity | 1 |
| 34 | Wavelength $\lambda_{IND}$ | 1 |
| 35 | (TBD) | |
| 36 | Maximum read power at reference velocity | 1 |
| 37 | $P_{IND}$ at reference velocity | 1 |
| 38 | $\beta_{target}$ at reference velocity | 1 |
| 39 | Maximum read power at maximum velocity | 1 |
| 40 | $P_{IND}$ at maximum velocity | 1 |
| 41 | $\beta_{target}$ at maximum velocity | 1 |
| 42 | $T_{top}$ (≥4) first pulse duration for $cm^1$ ≥4 at reference velocity | 1 |
| 43 | $T_{top}$ (=3) first pulse duration for $cm^1$ =3 at reference velocity | 1 |
| 44 | $T_{mp}$ multi pulse duration at reference velocity | 1 |
| 45 | $T_{lp}$ last pulse duration at reference velocity | 1 |
| 46 | $dT_{top}$ first pulse lead time at reference velocity | 1 |
| 47 | $dT_{le}$ 1$^{st}$ pulse leading edge correction for $ps^2$ =3 | 1 |
| 48 | $T_{top}$ (≥4) first pulse duration for $cm^1$ ≥4 at maximum velocity | 1 |
| 49 | $T_{top}$ (=3) first pulse duration for $cm^1$ =3 at maximum velocity | 1 |
| 50 | $T_{mp}$ multi pulse duration at maximum velocity | 1 |
| 51 | $T_{lp}$ last pulse duration at maximum velocity | 1 |
| 52 | $dT_{top}$ first pulse lead time at maximum velocity | 1 |
| 53 | $dT_{le}$ 1$^{st}$ pulse leading edge correction for $ps^2$ =3 | 1 |
| 54 to 255 | Reserved - All (00) | 202 |

FIG. 7

| bit 7 to bit 4 | $dT_{le}$ shift (Tw) |
|---|---|
| 0000 | 0 |
| 0001 | 0,0625 |
| 0010 | 0,1250 |
| 0011 | 0,1875 |
| 0100 | 0,2500 |
| 0101 to 1011 | reserved |
| 1100 | -0,2500 |
| 1101 | -0,1875 |
| 1110 | -0,1250 |
| 1111 | -0,0625 |

FIG. 8

|  | Description | Nominal radius in mm | PSN of the first Physical Sector | Number of Physical Sectors |
|---|---|---|---|---|
| Inner Drive Area | Initial Zone | start 22,000 mm | -- | blank |
|  | Inner Disc Test Zone | start 22,643 mm | (023480) | 16 384 |
|  | Inner Disc Count Zone | start 23,079 mm | (027480) | 4 096 |
|  | Inner Disc Administration Zone | start 23,186 mm | (028480) | 4 096 |
|  | Table of Contents Zone | start 23,293 mm | (029480) | 4 096 |
| Lead-in | Guard Zone 1 | start 23,400 mm | (02A480) | 14 848 |
|  | Reserved Zone 1 |  | (02DE80) | 4 096 |
|  | Reserved Zone 2 |  | (02EE80) | 64 |
|  | Inner Disc Identification Zone |  | (02EEC0) | 256 |
|  | Reserved Zone 3 |  | (02EFC0) | 64 |
|  | Reference Code Zone | start 23,896 mm | (02F000) | 32 |
|  | Buffer Zone 1 |  | (02F020) | 480 |
|  | Control Data Zone |  | (02F200) | 3 072 |
|  | Buffer Zone 2 |  | (02FE00) | 512 |
| Data | Data Zone | start 24,000 mm | (030000) | 2 295 104 max |
| Lead-out | Buffer Zone 3 | start 58,000 mm max | (260540) max | 768 |
|  | Outer Disc Identification Zone |  | (260840) max | 256 |
|  | Guard Zone 2 |  | (260940) max | 4096 min |
| Outer Drive Area | Outer Disc Administration Zone | start 58,053 mm | (261940) | 4096 |
|  | Outer Disc Count Zone | start 58,096 mm | (262940) | 4096 |
|  | Outer Disc Test Zone | start 58,139 mm | (263940) | 16 384 |
|  | Guard Zone 3 | start 58,310 mm | (2652C0) | blank |

FIG.10

| | Initial Zone | |
|---|---|---|
| Physical Sector 144 512 | Inner Disc Test Zone<br>16 384 Physical Sectors | Physical Sector (023480) |
| Physical Sector 160 895 | | Physical Sector (02747F) |
| Physical Sector 160 896 | Inner Disc Count Zone<br>4 096 Physical Sectors | Physical Sector (027480) |
| Physical Sector 164 991 | | Physical Sector (02847F) |
| Physical Sector 164 992 | Inner Disc Administration Zone<br>4 096 Physical Sectors | Physical Sector (028480) |
| Physical Sector 169 087 | | Physical Sector (02947F) |
| Physical Sector 169 088 | Table of Contents Zone<br>4 096 Physical Sectors | Physical Sector (029480) |
| Physical Sector 173 183 | | Physical Sector (02A47F) |
| | Guard Zone 1 | |

FIG.11

| Physical Sector of TOC block | Main Data byte position | Description | number of bytes |
|---|---|---|---|
| 0 | $D_0$ to $D_3$ | Content Descriptor | 4 |
| 0 | $D_4$ to $D_7$ | Reserved and set to (00) | 4 |
| 0 | $D_8$ to $D_{39}$ | Drive ID | 32 |
| 0 | $D_{40}$ to $D_{63}$ | Reserved and set to (00) | 24 |
| 0 | $D_{64}$ to $D_{95}$ | Session item 0 | 16 |
| 0 | ... | | |
| 0 | $D_{64+i\times16}$ to $D_{95+i\times16}$ | Session item i | 16 |
| 0 | ... | ... | |
| 0 | $D_{64+(N-1)\times16}$ to $D_{95+(N-1)\times16}$ | Session item N-1 | 16 |
| 0 | $D_{64+N\times16}$ to $D_{2047}$ | Reserved and set to (00) | 1 984 - Nx16 |
| 1 to 15 | $D_0$ to $D_{2047}$ | Reserved and set to (00) | 15×2 048 |

FIG.12

| Item byte position | Description | number of bytes |
|---|---|---|
| $B_0$ to $B_2$ | Session item descriptor | 3 |
| $B_3$ | Session number | 1 |
| $B_4$ to $B_7$ | Session start address | 4 |
| $B_8$ to $B_{11}$ | Session end address | 4 |
| $B_{12}$ to $B_{15}$ | Reserved and set to (00) | 4 |

FIG.13

| | Table of Contents Zone | |
|---|---|---|
| Physical Sector 173 184 | Guard Zone 1<br>14 848 Physical Sectors<br>with Main Data set to (00) | Physical Sector (02A480) |
| Physical Sector 188 031 | | Physical Sector (02DE7F) |
| Physical Sector 188 032 | Reserved Zone 1<br>4 096 Physical Sectors | Physical Sector (02DE80) |
| Physical Sector 192 127 | | Physical Sector (02EE7F) |
| Physical Sector 192 128 | Reserved Zone 2<br>64 Physical Sectors | Physical Sector (02EE80) |
| Physical Sector 192 191 | | Physical Sector (02EEBF) |
| Physical Sector 192 192 | Inner Disc Identification Zone<br>256 Physical Sectors | Physical Sector (02EEC0) |
| Physical Sector 192 447 | | Physical Sector (02EFBF) |
| Physical Sector 192 448 | Reserved Zone 3<br>64 Physical Sectors | Physical Sector (02EFC0) |
| Physical Sector 192 511 | | Physical Sector (02EFFF) |
| Physical Sector 192 512 | Reference Code Zone<br>32 Physical Sectors | Physical Sector (02F000) |
| Physical Sector 192 543 | | Physical Sector (02F01F) |
| Physical Sector 192 544 | Buffer Zone 1<br>480 Physical Sectors<br>with Main Data set to (00) | Physical Sector (02F020) |
| Physical Sector 193 023 | | Physical Sector (02F1FF) |
| Physical Sector 193 024 | Control Data Zone<br>3 072 Physical Sectors | Physical Sector (02F200) |
| Physical Sector 196 095 | | Physical Sector (02FDFF) |
| Physical Sector 196 096 | Buffer Zone 2<br>512 Physical Sectors<br>with Main Data set to (00) | Physical Sector (02FE00) |
| Physical Sector 196 607 | | Physical Sector (02FFFF) |
| | Data Zone | |

FIG.15

| |
|---|
| Physical format information<br>2 048 bytes |
| Disc manufacturing information<br>2 048 bytes |
| Content provider information<br><br>14 x 2 048 bytes |

FIG.16

| | |
|---|---|
| Physical Sector 2 496 832 | Guard Zone 2 |
| Physical Sector 2 500 927 | Outer Disc Administration Zone<br>4 096 Physical Sectors — Physical Sector (261940)<br>Physical Sector (26293F) |
| Physical Sector 2 500 928 | |
| Physical Sector 2 505 023 | Outer Disc Count Zone<br>4 096 Physical Sectors — Physical Sector (262940)<br>Physical Sector (26393F) |
| Physical Sector 2 505 024 | |
| Physical Sector 2 521 407 | Outer Disc Test Zone<br>16 384 Physical Sectors — Physical Sector (263940)<br>Physical Sector (26793F) |
| Physical Sector 2 521 408 | Guard Zone 3<br>Blank — Physical Sector (267940) |

FIG. 18

DEVICE AND METHOD FOR RECORDING INFORMATION ON A TRACK HAVING PREFORMED POSITION INFORMATION

The invention relates to a device for recording at least one information block in track in a recordable area on a record carrier, which information block comprises data words and error correction words for correcting errors within the information block, and which track has preformed position information indicative of positions for recording the information blocks, which device comprises recording means for recording marks representing the information blocks and control means for recording and retrieving position data indicative of the position of the recorded information blocks.

The invention further relates to a method of recording at least one information block in track in a recordable area on a record carrier, which information block comprises data words and error correction words for correcting errors within the information block, and which track has preformed position information indicative of positions for recording the information blocks, which method comprises recording marks representing the information blocks and recording and retrieving position data indicative of the position of the recorded information blocks.

The invention further relates to a record carrier comprising a track in a recordable area for recording at least one information block, which information block comprises data words and error correction words for correcting errors within the information block, and which track has preformed position information indicative of positions for recording the information blocks and preformed control information for controlling the recording process.

A device and method for recording information signals on a record carrier is known from U.S. Pat. No. 5,124,966 (PHN12887). The information is encoded in information block comprising data words and error correction words for correcting errors within the information block. The device comprises recording means for recording marks representing the information blocks. The information of at least one information block is modulated to a modulated signal and recorded in the track at predefined locations indicated by preformed track position information. The device has control means for recording and retrieving position data indicative of the position of the recorded information blocks in a special area on the record carrier. A temporary table of contents (TOC) is recorded in the special area and retrieved during the recording of subsequent information signals. The temporary TOC represents position data indicative of the position of the recorded information blocks. Each time an information signal is recorded, additional data is to be recorded in the special area. For retrieving the actual status of the last recorded information the special area must be completely read. In a write once type of record carrier like CD-R the position data cannot be overwritten, and hence the amount of position data may become large.

It is an object of the invention to provide a more flexible and reliable system for recording position data.

For this purpose, the device as described in the opening paragraph is characterized in that the control means comprise mapping means for determining in which region the information block is recorded, the region being one of a number of consecutive regions constituting the recordable area, and for recording a random signal unit in a unit location in a mapping area of the record carrier, the unit location in the mapping area being indicative of said region, and the unit length of the random signal unit being substantially smaller then the length of said information block, and detecting means for retrieving from said mapping area if a region contains at least one information block by detecting the presence of the recorded random signal units. The method as described in the opening paragraph is characterized in that the method comprises determining in which region the information block is recorded, the region being one of a number of consecutive regions constituting the recordable area, and recording a random signal unit in a unit location in a mapping area of the record carrier, the unit location in the mapping area being indicative of said region, and the unit length of the random signal unit being substantially smaller then the length of said information block, and retrieving from said mapping area if a region contains at least one information block by detecting the presence of the recorded random signal units. A random signal unit indicates a signal segment representing data that may have any value, including a known and/or fixed pattern. This has the advantage that for detecting the amount of data recorded in the recordable area the amount of position data to be retrieved at most has the size of the mapping area. Hence response time of the device to a recording request will be short.

The invention is based on the following recognition. First the inventors have seen that a substantial amount of the response time of a recording device to a recording request is due to the amount of position data to be read. Secondly the inventors have seen that the amount of position data can be reduced by recording a mapping area using short random signal units. The unit length is smaller then the length of the information block and therefore no information can be retrieved from the recorded random signal units, but the fact that the unit location has been recorded or not provides information about the status of the corresponding region in the recordable area of the disc.

According to a second aspect of the invention the record carrier as described in the opening paragraph is characterized in that the control information comprises recorded area management information indicative of parameters to be recorded for managing a mapping area indicating in which regions information blocks are recorded, the region being one of a number of consecutive regions constituting the recordable area, the mapping area having unit locations for recording random signal units, the unit location in the mapping area being indicative of said region, and the unit length of the random signal unit being substantially smaller then the length of said information block. In an embodiment of the device the control means are arranged for retrieving control information from the record carrier, the control information comprising recorded area management information indicative of parameters to be recorded for managing the mapping area. This has the advantage that the recording device can retrieve position data from a mapping area in dependence on the type of record carrier. Hence different types of record carriers and different configurations of the mapping area can be used in a single recording device.

In an embodiment of the device, where the preformed position information is encoded in address frames having a frame length, the unit length is substantially equal to the frame length. This has the advantage that the unit locations correspond to address frames, and can therefore be easily located and read using the circuitry already required in the device for reading information blocks.

It is noted that U.S. Pat. No. 5,293,566 describes a recording device for recording a record carrier of a rewriteable type. In a disc control region the address of a latest recorded sector is recorded. This region is rewritten each time a new information signal is recorded. Hence reading information from the disc control region which is often rewritten may become unreliable because of wear of that part of the record carrier; and such method is not suitable for write once type of record carriers.

Figure 4:
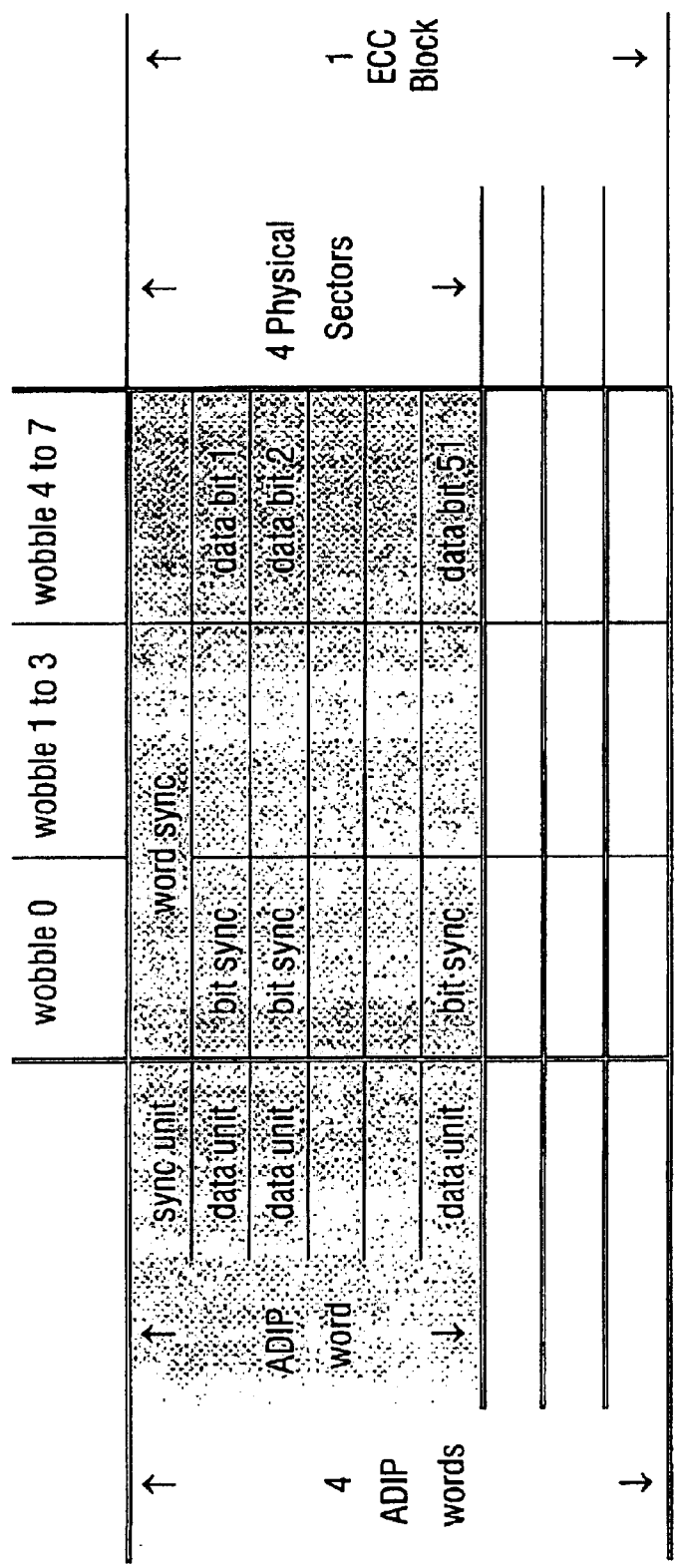
Figure 9:
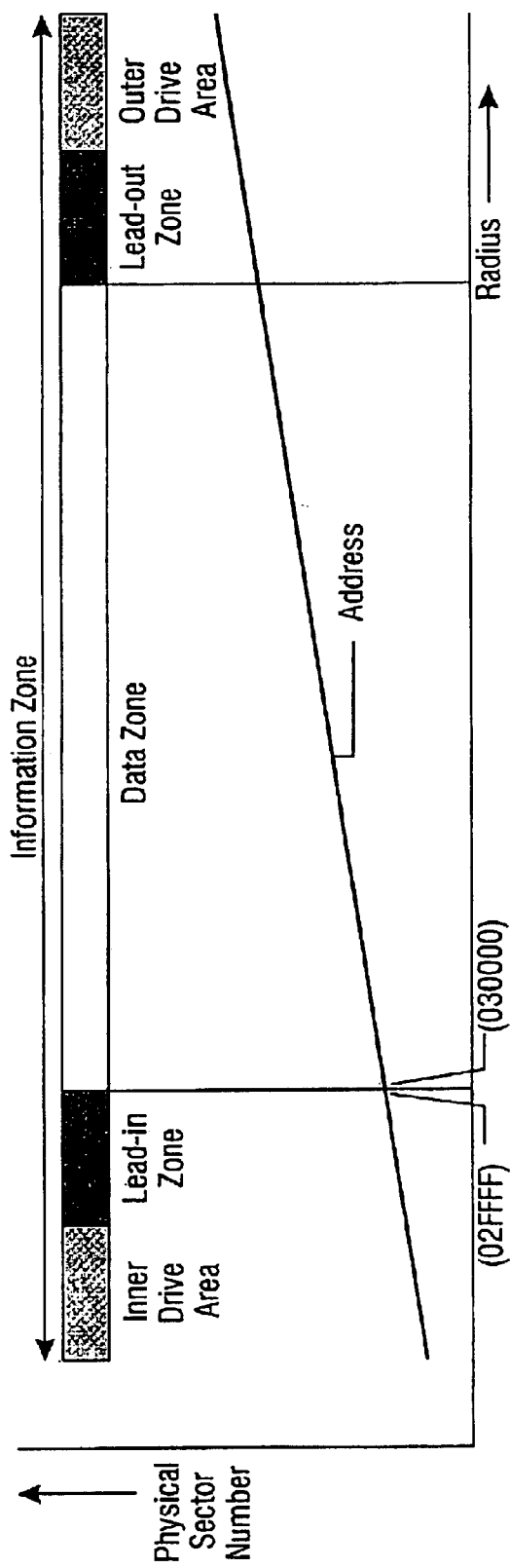
Figure 14:
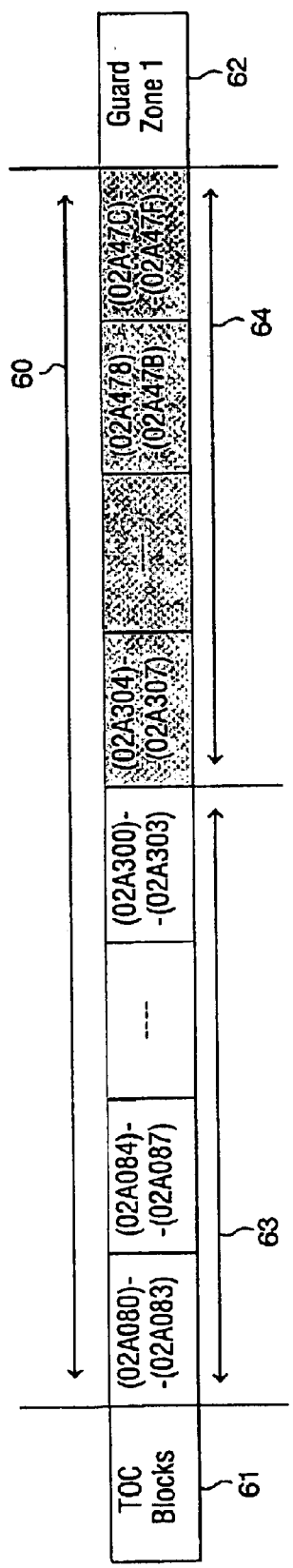
Figure 17:
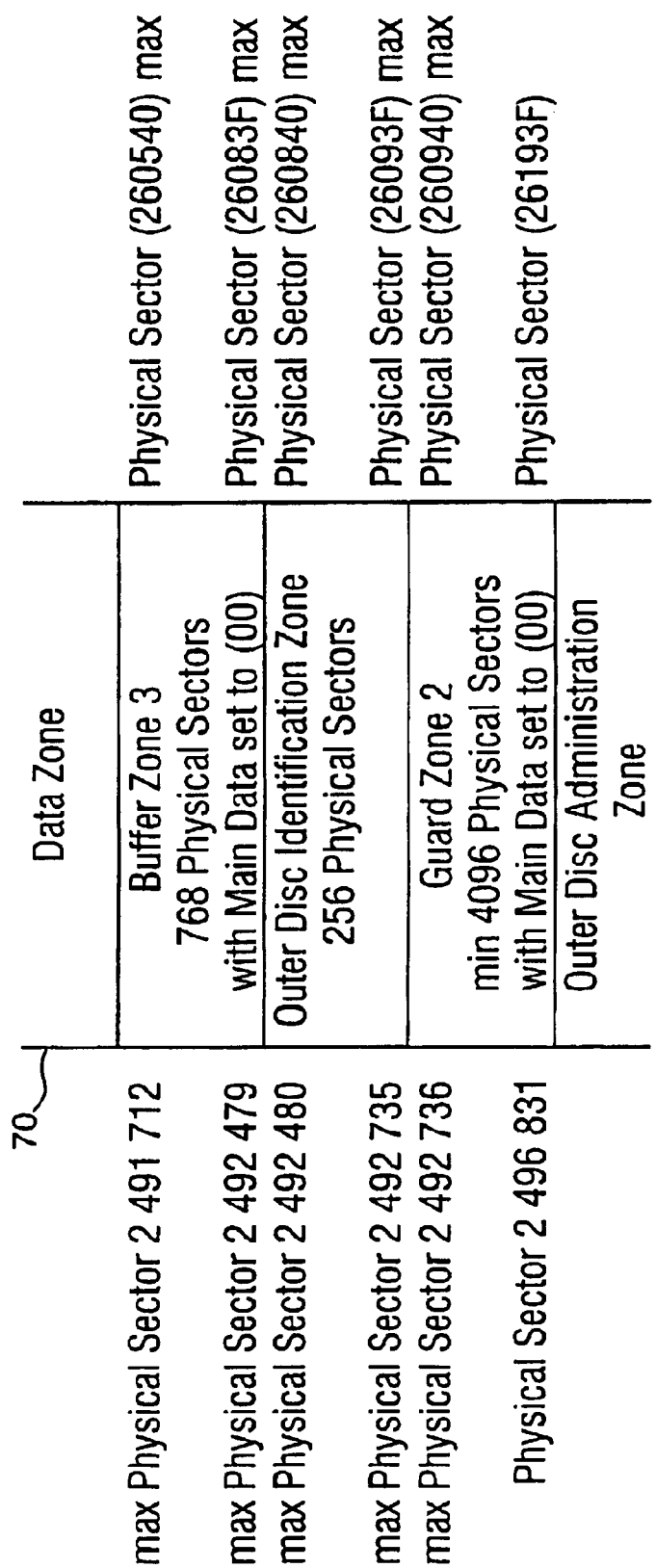

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording device, FIG. 3 shows the alignment of ADIP and information blocks, FIG. 4 shows the ADIP word structure, FIG. 5 shows the ADIP error correction structure, FIG. 6 shows the ADIP modulation rules, FIG. 7 shows a table of Physical disc information, FIG. 8 shows leading edge correction times, FIG. 9 shows the record carrier sector numbering, FIG. 10 shows a layout of a recorded single-session disc, FIG. 11 shows the Inner Drive Area, FIG. 12 shows a format of a TOC block, FIG. 13 shows a session item, FIG. 14 shows Recorded Area Indicators, FIG. 15 shows the Lead-in Zone, FIG. 16 shows the structure of a Control Data Block, FIG. 17 shows the Lead-Out zone, and FIG. 18 shows the Outer Drive Area.

Corresponding elements in different FIGS. have identical reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW. Further details about the DVD disc can be found in reference: ECMA-267: 120 mm DVD—Read-Only Disc—(1997). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses, for indication the location of units of information, usually called information blocks. The position information includes specific synchronizing marks for locating the start of such information blocks. The position information is encoded in frames of modulated wobbles as described below.

FIG. 1b is a cross-section taken along the line b—b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying information represented by modulated signals comprising frames. A frame is a predefined amount of data preceded by a synchronizing signal. Usually such frames also comprise error correction codes, e.g. parity words. A number of such frames constitute an information block, the information block comprising further error correction words. The information block is the smallest recordable unit from which information can be reliably retrieved. An example of such a recording system is known from the DVD system, in which the frames carry 172 data words and 10 parity words, and 208 frames constitute an ECC block.

In an embodiment of the record carrier the track 9 has preformed position information indicative of positions for recording the information blocks and preformed control information for controlling the recording process. The control information comprises recorded area management information indicative of parameters to be recorded for managing a mapping area indicating in which regions information blocks are recorded. The system of managing a mapping area is described below with the device. The recorded area management information determines specific parameters of the system to be used for the specific record carrier, e.g. the size of the mapping area or the size of the regions.

FIG. 2 shows a recording device for writing information on a record carrier 11 of a type which is writable or re-writable, for example CD-R or CD-RW. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an input unit 27, and modulator means comprising a formatter 28 and a modulator 29. The control unit 20 controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below with reference to FIGS. 3 to 7. The control unit 20 may also be implemented as a state machine in logic circuits. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. User information is presented on the input unit 27, which may comprise of compression means for input signals such as analog audio and/or video, or digital uncompressed audio/video. Suitable compression means are described for audio in WO 98/16014-A1 (PHN 16452), and for video in the MPEG2 standard. The input unit 27 processes the audio and/or video to unit of information, which are passed to the formatter 28 for adding control data and formatting the data according to the recording format (as described below), e.g. by adding error correction codes (ECC) and/or interleaving. For computer applications units of information may be interfaced to the formatter 28 directly. The formatted data from the output of the formatter 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20. The device has mapping means comprising a mapping unit 31 coupled to the control unit 20 and detection means comprising a detection unit 32 coupled to the control unit 20 and the mapping unit 31. The mapping unit 31 has an output 33 coupled to the modulation unit 29 for writing information marks, in particular a random signal unit, i.e. a writing signal of random data having the length of an address frame as described below. The detection unit has an input 34 for detecting written marks, in particular for detecting the HF signal generated when a written part of the track is scanned by the head 22. The control unit (20) is arranged for recording and retrieving position data indicative of the position of the recorded information blocks. The mapping unit 31 is arranged for determining in which region an information block is recorded. For that purpose the record carrier is subdivided in regions, each region being one of a number of consecutive regions constituting the recordable area. After determining that in a specific region at least one information block has been recorded, the mapping unit records a random signal unit in a unit location in a mapping area of the record carrier. The mapping area is an area of the record carrier for managing information about the status of the recording area, e.g. if certain parts of the recording area are unrecorded. Said unit location in the mapping area indicates said specific region, and hence if a unit location has been recorded this indicates that the corresponding region contains at least one information block. The unit length of the random signal unit is substantially smaller then the length of said information block, and therefore the amount of space required for the mapping area is limited. The detecting unit 32 retrieves from said mapping area if a region contains at least one information block by detecting the presence of the recorded random signal units in a specific unit locations. For example the positions for recording the information blocks have consecutive addresses, and the highest written unit location indicates the highest written region in the recording area. The detecting means then detect the highest written address by detecting the highest written region from the mapping area and then subsequently detect the highest written address by detecting the presence of marks on several positions within the highest written region according to a systematic search. Such search may be a logarithmic search, wherein iteratively an address is selected at substantially 50% of the remaining unknown part of the region for testing if marks are present.

In an embodiment of the device the mapping area has a consecutive range of unit locations corresponding to the number of regions, and the mapping means are arranged for recording the random signal unit in a position within the range of unit locations corresponding to the position of the region within the recording area. In a practical design the size of each region is equal, for example the size of each region is 640 information blocks. Using a suitable number of 256 regions the total recording area of the record carrier is covered.

In an embodiment of the device the control means 20 are arranged for retrieving control information from the record carrier. The control information is preformed information, e.g. encoded in the wobble of the pregroove, and includes parameters for controlling the recording process. The control information comprises recorded area management information indicative of parameters to be recorded for managing the mapping area. The mapping unit 31 and the detecting unit 32 are set to specific values by the parameters indicated in the recorded area management information, e.g. the size of the mapping area. The recorded area management information may for example contain a disc type indicator, indicating a specific type of disc which has a predefined size of the mapping area.

In an embodiment of the record carrier the preformed position information is encoded in address frames having a frame length, e.g. as described below the ADIP frame. In an embodiment of the device the mapping unit writes the random signal units with the unit length being substantially equal to the frame length.

In an embodiment of the device the control means are arranged for incrementally recording table of contents information in a TOC zone on the record carrier, which incrementally recording starts at the beginning address of the TOC zone. A format for the table of contents is described below. The mapping means 31 are arranged for recording the mapping area within the TOC zone from the end address of the TOC zone. The unit locations are used starting at the highest address in the TOC zone, and each subsequent region used is indicated by writing a unit location having a subsequent lower address. A detailed format description is given below, where the unit locations are called recorded area indicators. In an embodiment of the device the detecting means 32 comprise calculation means for calculating the start address of the region containing the highest written address PSN by $$PSN=(E\_TOC-L\_MAP)*(R\_SIZE/U\_LEN)+S\_RECA.$$

In the formula E_TOC is the end address of the TOC zone, L_MAP is the address of the lowest written unit location in the mapping area, R_SIZE is the size of each region, U_LEN is the unit length of the random signal unit, and S_RECA is the start address of the first region in the recordable area. Practical values are given below.

A practical embodiment of the system for recording information according to the invention is as follows. The system specifies the mechanical, physical and optical characteristics of a 120 mm recordable optical discs with capacities of 4,7 Gbytes and 9,4 Gbytes. It specifies the quality of the recorded and unrecorded signals, the format of the data and the recording method, thereby allowing for information interchange by means of such discs. The data can be written once and read many times using a non-reversible method. These discs are identified as DVD+R. The track shape is as follows. The recordable area, called the Information Zone, shall contain tracks formed from a single spiral groove. Each track shall form a 360° turn of a continuous spiral. Recordings shall be made in the groove. The tracks in the Information Zone contain a phase modulated sinusoidal deviation from the nominal centrelines, called wobble, which contains addressing information called Address-in-Pregroove or ADIP. The tracks shall be continuous in the Information Zone. The groove tracks shall start at a radius of 22,0 mm max. and end at a radius of 58,50 mm min. The track path shall be a continuous spiral from the inside (beginning of the Lead-in Zone) to the outside (end of the Lead-out Zone) when the disc rotates counter-clockwise as viewed from the optical head. The track pitch is the distance measured between the average track centrelines of adjacent tracks, measured in the radial direction. The track pitch shall be 0,74 µm ±0,03 µm. The track pitch averaged over the Information Zone shall be 0,74 µm±0,01 µm. The wobble of the tracks is a sinusoidal deviation from the nominal centrelines, with a wavelength of 4,265 6 µm±0,045 0 µm (equivalent to 32 Channel bits). The Total Harmonic Distortion (THD) of the oscillator for generating the wobble sine wave shall be ≦−40 dB. The wobble is phase modulated by inverting wobble cycles. The information contained in the wobble modulation is called Address-in-Pregroove or ADIP.

FIG. 3 shows the alignment of ADIP and information blocks. The information blocks 37 to be recorded onto the disc must be aligned with the ADIP information 39 modulated in the wobble 38. It is shown that 93 wobbles correspond to 2 Sync Frames, which are the start of an information block. Of each 93 wobbles, 8 wobbles are phase modulated with ADIP information. Further 1 wobble equals 32 Channel bits (=32T) and one ADIP unit=8 modulated wobbles per 2 Sync Frames.

FIG. 4 shows the ADIP word structure. 52 ADIP units are grouped into one ADIP word each. This means that one ADIP word corresponds to 4×13×2 Sync Frames=4 Physical Sectors. Each ADIP word consists of: 1 ADIP sync unit+51 ADIP data units. The ADIP sync unit=4 inverted wobbles for word sync+4 monotone wobbles. The ADIP data unit=1 inverted wobble for bit sync+3 monotone wobbles+4 wobbles representing one data bit. (see 0)
The information contained in the data bits of an ADIP word is as follows:

bit 1: this bit is reserved and shall be set to ZERO.

bit 2 to 23: these 22 bits contain a Physical Address. Data bit 2 is the most significant bit (MSB) and data bit 23 is the least significant bit (LSB). The addresses increase by one for each next ADIP word. The first address in the Information Zone shall be such that Physical Address (00C000) is located at radius $24,0^{+0,0}_{-0,2}$ mm.

bit 24 to 31: these 8 bits contain auxiliary information about the disc, e.g. recording control information. In the Data Zone and the Lead-out Zone of the disc the auxiliary bytes shall be set to (00). In the Lead-in Zone of the disc the auxiliary bytes shall be used as follows:

Bit 24 to 31 from 256 consecutive ADIP words shall form one ADIP Aux Frame with 256 bytes of information. The first byte of each ADIP Aux Frame shall be located in an ADIP word with a Physical Address that is a multiple of 256 (Physical Address= (xxxx00)). The contents of the 256 bytes are defined in FIG. 7.

bit 32 to 51: these 20 bits contain error correction parities for the ADIP information.

FIG. 5 shows the ADIP error correction structure. For the ADIP error correction the ADIP data bits are grouped into 4-bit nibbles. The mapping of the data bits into the nibble array is defined in FIG. 5. Bit 0 is a dummy bit, which shall be considered as set to ZERO for the error corrector.

A nibble-based RS (13,8,6) code is constructed, of which the 5 parity nibbles $N_8$ to $N_{12}$, are defined by the remainder polynomial R(x):

$$R(x) = \sum_{i=8}^{12} N_i x^{12-i} = 1(x) x^5 \bmod G_{PA}(x)$$

where $$I(x) = \sum_{i=0}^{7} N_i x^{7-i}$$

$$G_{PA}(x) = \prod_{k=0}^{4} (x + \alpha^k)$$

α is the primitive root 0010 of the primitive polynomial P(x)=x4+x+1 All bits of the 5 parity nibbles $N_8$ to $N_{12}$ shall be inverted before recording.

Figure 6A:
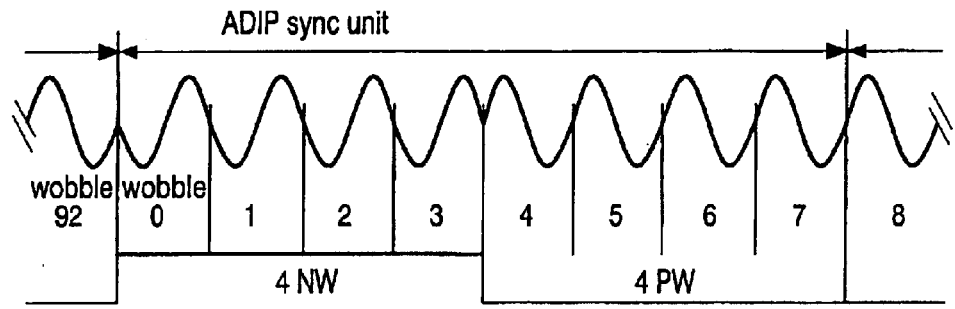
Figure 6B:
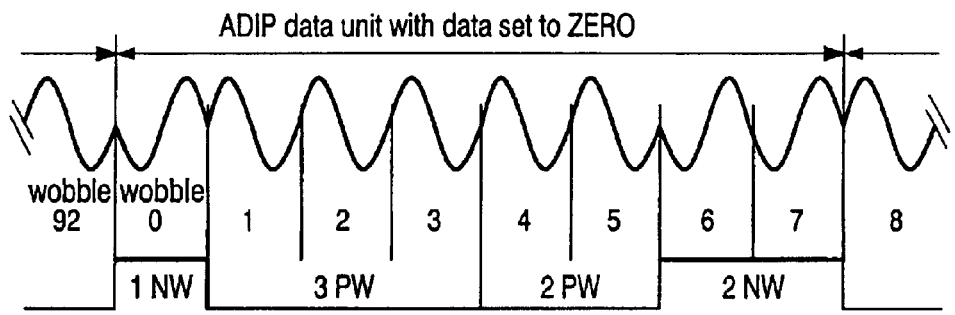
Figure 6C:
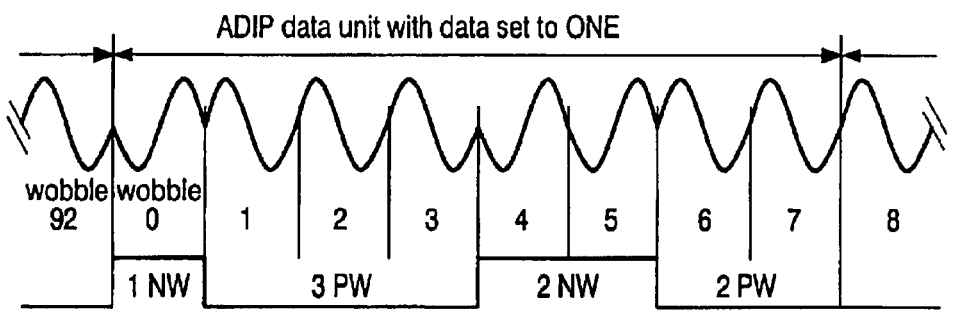

FIG. 6 shows the ADIP modulation rules. The ADIP units are modulated by inverting some of the 8 wobble cycles. FIG. 6a shows Modulation of the ADIP word sync, FIG. 6b shows Modulation of an ADIP ZERO bit, and FIG. 6c shows Modulation of an ADIP ONE bit, wherein PW is a positive wobble, which starts moving towards the inside of the disc.

NW is a negative wobble, which starts moving towards the outside of the disc.

all monotone wobbles are indicated as PWs.

FIG. 7 shows a table of Physical disc information. The Physical disc information is encoded in ADIP as described above. This information shall comprise the 256 bytes shown in FIG. 7. It contains disc information and values used for the Optimum Power Control (OPC) algorithm to determine optimum laser power levels for writing. The information is copied into a recordable zone called the Control Data during initialization of the disc. The data contents are

| | |
|---|---|
| Byte 0 - | Disc Category and Version Number |
| Bits b7 to b4 | shall specify the Disc Category, they shall be set to 1010, indicating a DVD + R disc. |
| Bits b3 to b0 | shall specify the Version Number, they shall be set to 0000 indicating the version |
| Byte 1 - | Disc size and maximum transfer rate |
| Bits b7 to b4 | shall specify the disc size, they shall be set to 0000, indicating a 120 mm disc |
| Bits b3 to b0 | shall specify the maximum read transfer rate, they shall be set to 1111 indicating no maximum read transfer rate is specified |
| Byte 2 - | Disc structure |
| Bit b7 to b4 | shall be set to 0000 |
| Bits b3 to b0 | shall specify the type of the recording layer(s): they shall be set to 0010, indicating a write-once recording layer. |
| Byte 3 - | Recording density |
| Bits b7 to b4 | shall specify the average Channel bit length in the Information Zone, they shall be set to 0000, indicating 0,133 $\mu$m |
| Bits b3 to b0 | shall specify the average track pitch, they shall be set to 0000, indicating an average track pitch of 0,74 $\mu$m |
| Bytes 4 to 15 - | Data Zone allocation |
| Byte 4 | shall be set to (00). |
| Bytes 5 to 7 | shall be set to (030000) to specify PSN 196.608 of the first Physical Sector of the Data Zone |
| Byte 8 | shall be set to (00). |
| Bytes 9 to 11 | shall be set to (26053F) to specify PSN 2.491.711 as the last possible Physical Sector of the Data Zone. |
| Bytes 12 to 15 | shall be set to (00) |
| Byte 16 - | (00) shall be set to (00). |
| Bytes 17 to 18 | Reserved. These bytes are reserved and shall be set to (00). |
| Bytes 19 to 26 | Disc Manufacturer ID. These 8 bytes shall identify the manufacturer of the disc. Trailing bytes not used shall be set to (00). |
| Bytes 27 to 29 - | Media type ID. Disc manufacturers can have different types of media, which shall be specified by these 3 bytes. The specific type of disc is denoted in this field. |
| Byte 30 - | Product revision number. This byte shall identify the product revision number in binary notation. All discs with the same Disc Manufacturer ID and the same Product ID, regardless of Product revision numbers, must have the same recording properties (only minor differences are allowed: Product revision numbers shall be irrelevant for recorders). If not used this byte shall be set to (00) |
| Byte 31 | number of Physical format information bytes in use. This byte forms one 8-bit binary number indicating the number of bytes actually in use for Physical format information. It shall be set to (36) indicating that only the first 54 bytes of the Physical format information are used. |
| Byte 32 - | Reference recording velocity. This byte indicates the lowest possible recording velocity of the disc, which is also referred to as the Reference velocity, as a number n such that<br>n = 10 × $v_{ref}$(n rounded off to an integral value)<br>It shall be set to (23) indicating a Reference writing speed of 3,49 m/s. |
| Byte 33 - | Maximum recording velocity. This byte indicates the highest possible recording velocity of the disc, as a number n such that<br>n = 10 × $v_{ref}$(n rounded off to an integral value)<br>It shall be set to (54) indicating a maximum writing speed of 8,44 m/s. |
| Byte 34 | Wavelength $\lambda$IND. This byte shall specify the wavelength in nanometers of the laser with which the optimum write parameters in the following bytes have been determined, as a number n such that<br>n = Wavelength − 600 |
| Byte 35 | Reserved |
| Byte 36 | Maximum read power, Pr at reference velocity. This byte shall specify the maximum read power Pr in milliwatts at the reference velocity as a number n such that<br>n = 20 × (Pr − 0,7) |
| Byte 37 | PIND at reference velocity. PIND is the starting value for the determination of Ppo used in the OPC algorithm. This byte shall specify the indicative value PIND of Ppo in milliwatts at the reference velocity as a number n such that<br>n = 20 × ($P_{IND}$ − 5) |
| Byte 38 | $\beta_{target}$ at reference velocity. This byte shall specify the target value for $\beta$, $\beta_{target}$ at the reference velocity used in the OPC algorithm as a number n such that<br>n = 10 × $\beta_{target}$ |
| Byte 39 | Maximum read power, Pr at maximum velocity. This byte shall specify the maximum read power Pr in milliwatts at the maximum velocity as a number n such that<br>n = 20 × (Pr − 0,7) |
| Byte 40 | $P_{IND}$ at maximum velocity. $P_{IND}$ is the starting value for the determination of Ppo used in the OPC algorithm. This byte shall specify the indicative value PIND of Ppo in milliwatts at the maximum velocity as a number n such that<br>n = 20 × (PIND − 5) |

-continued

| | |
|---|---|
| Byte 41 | $\beta_{target}$ at maximum velocity. This byte shall specify the target value for $\beta$, $\beta_{target}$ at the maximum velocity used in the OPC algorithm as a number n such that $n = 10 \times \beta_{target}$ |
| Byte 42 | Ttop ($\geq 4$) first pulse duration for current mark $\geq 4$ at reference velocity. This byte shall specify the duration of the first pulse of the multi pulse train when the current mark is a 4T or greater mark for recording at reference velocity. The value is expressed in fractions of the channel bit clock period as a number n such that $n = 16 \times T_{top}/T_W$ and $4 \leq n \leq 40$ |
| Byte 43 | Ttop (=3) first pulse duration for current mark =3 at reference velocity. This byte shall specify the duration of the first pulse of the multi pulse train when the current mark is a 3T mark for recording at reference velocity. The value is expressed in fractions of the channel bit clock period as a number n such that $n = 16 \times T_{top}/T_W$ and $4 \leq n \leq 40$ |
| Byte 44 | Tmp multi pulse duration at reference velocity. This byte shall specify the duration of the 2nd pulse through the 2nd to last pulse of the multi pulse train for recording at reference velocity. The value is expressed in fractions of the channel bit clock period as a number n such that $n = 16 \times T_{mp}/T_W$ and $4 \leq n \leq 16$ |
| Byte 45 | Tlp last pulse duration at reference velocity. This byte shall specify the duration of the last pulse of the multi pulse train for recording at reference velocity. The value is expressed in fractions of the channel bit clock period as a number n such that $n = 16 \times T_{lp}/T_W$ and $4 \leq n \leq 24$ |
| Byte 46 | dTtop first pulse lead time at reference velocity. This byte shall specify the lead time of the first pulse of the multi pulse train relative to the trailing edge of the second channel bit of the data pulse for recording at reference velocity. The value is expressed in fractions of the channel bit clock period as a number n such that $n = 16 \times dT_{top}/T_W$ and $0 \leq n \leq 24$ |
| Byte 47 | dTle 1st pulse leading edge correction for previous space =3 at reference velocity. Bit 7 to bit 4 of this byte shall specify the leading edge correction for the 1st pulse of the multi pulse train when the previous space was a 3T space for recording at reference velocity. The value is expressed in fractions of the channel bit clock period according to FIG. 8. |
| Byte 48 | Ttop ($\geq 4$) first pulse duration for current mark $\geq 4$ at maximum velocity. This byte shall specify the duration of the first pulse of the multi pulse train when the current mark is a 4T or greater mark for recording at maximum velocity. The value is expressed in fractions of the channel bit clock period as a number n such that $n = 16 \times T_{top}/T_W$ and $4 \leq n \leq 40$ |
| Byte 49 | Ttop (3) first pulse duration for current mark =3 at maximum velocity. This byte shall specify the duration of the first pulse of the multi pulse train when the current mark is a 3T mark for recording at maximum velocity. The value is expressed in fractions of the channel bit clock period as a number n such that $n = 16 \times T_{top}/T_W$ and $4 \leq n \leq 40$ |
| Byte 50 | Tmp multi pulse duration at maximum velocity. This byte shall specify the duration of the 2nd pulse through the 2nd to last pulse of the multi pulse train for recording at maximum velocity. The value is expressed in fractions of the channel bit clock period as a number n such that $n = 16 \times T_{mp}/T_W$ and $4 \leq n \leq 16$ |
| Byte 51 | Tlp last pulse duration at maximum velocity. This byte shall specify the duration of the last pulse of the multi pulse train for recording at maximum velocity. The value is expressed in fractions of the channel bit clock period as a number n such that $n = 16 \times T_{lp}/T_W$ and $4 \leq n \leq 24$ |
| Byte 52 | dTtop first putse lead time at maximum velocity. This byte shall specify the lead time of the first pulse of the multi pulse train relative to the trailing edge of the second channel bit of the data pulse for recording at maximum velocity. The value is expressed in fractions of the channel bit clock period as a number n such that $n = 16 \times dT_{top}/T_W$ and $0 \leq n \leq 24$ |
| Byte 53 | dTle first pulse leading edge correction for previous space =3 at maximum velocity. Bit 7 to bit 4 of this byte shall specify the leading edge correction for the 1st pulse of the multi pulse train when the previous space was a 3T space for recording at maximum velocity. The value is expressed in fractions of the channel bit clock period according to FIG. 8. |
| Bytes 54 to 255 | Reserved - All (00). These bytes shall be set to all (00). |

FIG. 8 shows leading edge correction times. The parameter is called $dT_{le}$ and is described above with FIG. 7 in byte 47. Bit 3 to bit 0 of this byte shall be set to 0000. Bit combinations not specified shall not be used.

FIG. 9 shows the record carrier sector numbering. The recordable area is called information zone. The Information Zone shall contain all information on the disc relevant for data interchange. The Information Zone may contain one or more sessions. Each session shall be divided in three parts: a Lead-in/Intro Zone, a Data Zone and a Lead-out/Closure Zone. In double-sided discs there is one Information Zone per side. The Data Zones are intended for the recording of User Data. The Lead-in Zone contains control information. The Lead-out Zone allows for a continuous smooth lead-out and also contains control information. The Inner and Outer Drive Areas are meant for disc testing. A description is given for a Single-session disc. In such a disc, the Lead-in Zone, the Data Zone and the Lead-out Zone constitute the recordable area in which the information is recorded using a non-reversible effect. The layout of a Multi-session disc is defined later.

FIG. 10 shows a layout of a recorded single-session disc. The Information Zone of single-sided and of each side of double-sided discs are sub-divided in an Inner drive area, a Lead-In, a Data zone, a Lead-Out area and an Outer Drive area. The radii are indicated for the Zones by nominal values of the centre of the first (or last) track of the Zone. Physical Sector Numbers (PSNs) are shown of the first Physical Sector of the each Zone. The Data zone shall have a first PSN (030000). The PSNs increase by 1 for each next Physical Sector in the whole Information Zone.

FIG. 11 shows the Inner Drive Area. The Inner Drive Area is the innermost zone of the disc which is used by the drive for performing disc tests and OPC algorithms. The Physical Sector Number of the first and last Physical Sector of each part is indicated in hexadecimal and decimal notation and the number of Physical Sectors in each part are indicated in decimal notation. The following subdivision is shown:

Initial Zone: This Zone shall remain blank.

Inner Disc Test Zone: 16384 Physical Sectors reserved for drive testing and OPC.

Inner Disc Count Zone: 4096 Physical Sectors reserved for counting the number of OPC algorithms performed in the Inner Disc Test Zone. Whenever an ECC Block or part of it in the Inner Disc Test Zone has been recorded, the ECC Block shall be flagged by recording 4 Physical Sectors in the Inner Disc Count Zone.

Inner Disc Administration Zone: 4096 Physical Sectors to be used for optional drive specific information. The first 16 physical sectors of this Zone shall be filled with all Main Data set to (00). The Inner Disc Administration Zone contains drive information, e.g. a drive identification (Drive ID) and data as defined by the drive manufacturer.

Table of Contents (TOC) Zone: 4096 Physical Sectors to store information about the locations of Sessions and recordings on the disc. The first 16 physical sectors of this Zone shall be filled with all Main Data set to (00). This Zone consists of 2 parts:

part 1: consists of 191 ECC Blocks (TOC Blocks) to be used to store the locations of all Closed Sessions, part 2: consists of 1024 Physical Sectors, grouped in units of 4 sectors, where each unit corresponds to one ADIP word. These units shall be used as Recorded Area Indicators.

FIG. 12 shows a format of a TOC block. Whenever a Session is closed, the next ECC Block in the Table of Contents Zone, immediately following the last TOC Block, shall be recorded with the locations of all Closed Sessions. The first ECC Block in the Table of Contents Zone has to be used as a run-in for the second ECC Block. If all 191 TOC Blocks have been used, additional Sessions still can be added, however the drive will have to apply a search procedure to find the additional Sessions. The FIG. shows the following contents for the TOC block for each physical sector:

Physical Sector 0/bytes D0 to D3—Content Descriptor. These bytes identify the Session DCB and shall be set to (544F4300), representing the characters "SDC" and the version number 0.

Physical Sector 0/byte D4 to D7—Reserved. To be set to (00)

Physical Sector 0/byte D8 to D39—Drive ID. These bytes shall contain the drive ID.

Physical Sector 0/byte D40 to D63—Reserved. To be set to (00)

Physical Sector 0/byte D64 to D2047—Session items. These bytes are grouped in units of 16 bytes each. Each unit of 16 bytes can contain a Session item according to FIG. 13. All unused bytes shall be set to (00).

FIG. 13 shows a session item. The TOC Block shall contain a Session item for each Closed Session on the disc. The Session items shall be ordered with increasing numbers and addresses, as follows:

byte B0 to B2: these 3 bytes identify the item type and shall be set to (53.53.4E), representing the characters "SSN".

byte B3: this byte shall specify the sequence number of the Session specified in this item.

byte B4 to B7: these 4 bytes shall specify the PSN of the first Physical Sector in the Data Zone of the Session specified in this item.

byte B8 to B11: these 4 bytes shall specify the PSN of the last Physical Sector in the Data Zone of the Session specified in this item.

byte B12 to B15: these 4 bytes are reserved and shall be set to (00).

FIG. 14 shows Recorded Area Indicators. The last part of the TOC zone for recording TOC blocks 61 is shown schematically. A mapping area 60 is located at the end of the TOC zone. The next zone, i.e. the Guard zone 62, is shown at the right end. The mapping area is recorded starting at the highest address. A recorded part 64 indicates the recorded regions of the recordable area, and the unrecorded part 63 indicates unrecorded regions. To speed up the access of the disc, the recorder needs to know in which region of the disc the last written ECC Block can be found. For this purpose the mapping area is defined, based on recorded areas with the size of 4 Physical Sectors, each area corresponding to one ADIP word. These areas shall be recorded with random EFM signals. No gaps are allowed between recorded ADIP words. 1024 Physical Sectors have been reserved for this purpose, allowing to divide the disc into maximum 256 regions. The Recorded Area Indicators shall be used from the outer side of the TOC Zone towards the inner side of the TOC Zone. By means of an "HF-detection" the recorder can find the location of the start of the Recorded Area Indicators and determine the region in which the last recorded ECC Block can be found. Each region of 640 ECC Blocks between PSN=(030000) and PSN=(26053F) corresponds to one Recorded Area Indicator. All regions up to and including the last recorded ECC Block shall be indicated by their Recorded Area Indicator. In mathematical form: if the first Recorded Area Indicator is composed of the Physical Sectors with PSNRAI to PSNRAI+3, than the last recorded ECC Block can be found between:

PSN={(02A47C)−(PSNRAI)}×(A0)+(030000) and

PSN={(02A47C)−(PSNRAI)}×(A0)+(030280) or in decimal notation:

PSN={173180−PSNRAI}×160+196608 and

PSN={173180−PSNRAI}×160+197248

In an embodiment of the device the detecting unit 32 is arranged for logarithmically searching the mapping area, by iteratively detecting HF signals at a test address at 50% of the untested part of the mapping area, the mapping area having a single recorded part indicating consecutively recorded regions. When no marks are detected at a test address then the next test address is at 50% of the untested address range towards to start of the mapping area, and vice versa. The final untested address range can be detected continuously, when said final untested address range has become so small that jumping to logarithmical locations would take more time. A similar search process can be used to detect the highest written address within the region.

FIG. 15 shows the Lead-in Zone. The Lead-in Zone is located at the inner side of the Information Zone. A maiden disc does not have any data recorded in the Lead-in Zone. After finalization of the disc or closing of the first Session, the Lead-in Zone shall be recorded as described below. FIG. 15 shows the zones and the addresses, as follows (notation like in FIG. 11):

Guard Zone 1: The Guard Zone is used to create a minimum amount of Lead-in Zone required for compatibility. This zone shall contain 14.848 Physical Sectors, all filled with Main Data set to (00).

Reserved Zone 1: 4096 Physical Sectors are reserved and shall be set (00).

Reserved Zone 2: 64 Physical Sectors are reserved and shall be set (00).

Inner Disc Identification Zone: 256 Physical Sectors reserved for information agreed upon by the data interchange parties. Each set of 16 Physical Sectors from one ECC Block is either a Disc Control Block (DCB) or recorded with all (00) Main Data. Each ECC Block in this Zone following one recorded with all (00) Main Data shall also be recorded with all (00) Main Data.

ECC Blocks which generate a specific Channel bit pattern on the disc. This shall be achieved by setting to (AC) all 2048 Main Data bytes of each corresponding Data Frame. Moreover, no scrambling shall be applied to these Data Frames, except to the first 160 Main Data bytes of the first Data Frame of each ECC Block.

Buffer Zone 1: This Zone shall consist of 480 Physical Sectors from 30 ECC Blocks. The Main Data of the Data Frames in this Zone shall be set to all (00).

Control Data Zone: This Zone shall consist of 3072 Physical Sectors from 192 ECC Blocks. The content of the 16 Physical Sectors of each ECC Block is repeated 192 times.

Buffer Zone 2: This recorded Zone shall consist of 512 Physical Sectors from 32 ECC Blocks. The Main Data of the Data Frames in this Zone shall be set to all (00).

FIG. 16 shows the structure of a Control Data Block. The first 2048 bytes constitute Physical format information, of which the contents are given in FIG. 7. The next 2048 bytes constitute Disc Manufacturing information. The last 14×2048 bytes are available for Content Provider Information. In an embodiment of the device the 28.672 bytes of Content Provider Information are set to zero (00). Data received from a host be is blocked and not recorded in this field. This prevents data of a confidential nature, for example decryption keys for decoding video of a DVD video disc, to be recorded here. The Physical format information contains disc and format information. The information in bytes 0 to 255 shall be copied from the ADIP auxiliary data during finalization of the disc or closing of the first Session, and shall reflect the actual status of the disc or first Session (e.g. the actual end of the Data Zone). All 256 bytes have the same definitions and contents as the Physical Disc information defined in FIG. 7, except the following bytes:

| | |
|---|---|
| Byte 0 - | Disc Category and Version Number |
| Bits b7 to b4 | shall specify the Disc Category indicating a DVD+R disc. |
| Bits b3 to b0 | shall specify the Version Number of the System Description |
| Byte 1 - | Disc size and maximum transfer rate |
| Bits b7 to b4 | shall specify the disc size, |
| | they shall be set to 0000, indicating a 120 mm disc |
| Bits b3 to b0 | shall specify the maximum read transfer rate. |
| | These bits may be set to one of the following values, depending on the maximum read-out speed needed by the application: |
| | 0000: a maximum transfer rate of 2,52 Mbits/s |
| | 0001: a maximum transfer rate of 5,04 Mbits/s |
| | 0010: a maximum transfer rate of 10,08 Mbits/s |
| | 1111: no maximum transfer rate is specified. |
| | All other combinations are reserved and shall not be used. |
| Byte 2 - | Disc structure |
| Bit b7 to b4 | shall be set to 0000 |
| Bits b3 to b0 | shall specify the type of the recording layer(s): |
| | they shall be set to 0010, indicating a write-once recording layer. |
| Bytes 4 to 15 - | Data Zone allocation |
| Byte 4 | shall be set to (00). |
| Bytes 5 to 7 | shall be set to (030000) to specify PSN 196.608 of the first Physical Sector of the Data Zone |
| Byte 8 | shall be set to (00). |
| Bytes 9 to 11 | shall specify the Sector Number of the last Physical Sector of the Data Zone of the first Session. |
| Bytes 12 to 15 | shall be set to (00) |
| Bytes 256 to 2 047 - | Reserved. These remaining bytes have no relation to the ADIP information and shall be set to zero (00). |

Reserved Zone 3: 64 Physical Sectors are reserved and shall be set (00).

Reference Code Zone: The recorded Reference Code Zone shall consist of the 32 Physical Sectors from two FIG. 17 shows the Lead-Out zone. At the top the data zone 70 for recording user data is shown. The data zone has 2.295.104 Physical Sectors of user data area. The start radius of the Data Zone is determined by the location of ADIP Physical Address (00C000). After the Data zone follows the Lead-out Zone. The Lead-out Zone is located at the outer side of the Information Zone. FIG. 17 shows the following parts:

Buffer Zone 3: This recorded Zone shall consist of 768 Physical Sectors. The last possible start location of Buffer Zone 3 is (260540). The Main Data of the Data Frames in this Zone shall be set to all (00).

Outer Disc Identification Zone: 256 Physical Sectors reserved for information agreed upon by the data interchange parties. Each set of 16 Physical Sectors from one ECC Block is either a Disc Control Block (DCB) or recorded with all (00) Main Data. The contents of this Zone shall be equivalent to the contents of the last Inner Session Identification Zone (or to the contents of the Inner Disc Identification Zone in case of a Single-session disc).

Guard Zone 2: This Guard Zone is used as a protection for separating test writing zones from information zones containing user data. This Zone shall be filled with Main Data set to (00). This zone shall contain a minimum of 4096 Physical Sectors.

Outer Drive Area: The Outer Drive Area is the outermost zone of the disc which is used by the drive for performing disc tests and OPC algorithms.

FIG. 18 shows the Outer Drive Area, starting at the Guard zone 2. Then the following parts are shown:

Outer Disc Administration Zone: 4096 Physical Sectors to be used for optional drive specific information. The first 16 physical sectors of this Zone shall be filled with all Main Data set to (00). This zone can be used in the same way as the Inner Disc Administration Zone (see 0).

Outer Disc Count Zone: 4096 Physical Sectors reserved for counting the number of OPC algorithms performed in the Outer Disc Test Zone.

Outer Disc Test Zone: 16384 Physical Sectors reserved for drive testing and OPC algorithms. Whenever an ECC Block or part of it in the Outer Disc Test Zone has been recorded, the ECC Block shall be flagged by recording 4 Physical Sectors in the Outer Disc Count Zone.

Guard Zone 3: This Zone shall remain blank.

Although the invention has been explained mainly by embodiments using the DVD+R, similar embodiments are suitable for other optical recording systems. Also for the information carrier an optical disc has been described, but other media, such as a magnetic disc or tape, may be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

What is claimed is:

1. Device for recording at least one information block in track in a recordable area on a record carrier, which information block comprises data words and error correction words for correcting errors within the information block, and which track has preformed position information indicative of positions for recording the information blocks, which device comprises recording means (22) for recording marks representing the information blocks and control means (20) for recording and retrieving position data indicative of the position of the recorded information blocks, characterized in that the control means comprise mapping means (31) for determining in which region the information block is recorded, the region being one of a number of consecutive regions constituting the recordable area, and for recording a random signal unit in a unit location in a mapping area of the record carrier, the unit location in the mapping area being indicative of said region, and the unit length of the random signal unit being substantially smaller than the length of said information block, and detecting means (32) for retrieving from said mapping area if a region contains at least one information block by detecting the presence of the recorded random signal units.

2. Device as claimed in claim 1, wherein the mapping area comprises a consecutive range of unit locations corresponding to the number of regions, and the mapping means are arranged for recording the random signal unit in a position within the range of unit locations corresponding to the position of the region within the recording area.

3. Device as claimed in claim 2, wherein the size of each region is equal, or wherein the size of each region is 640 information blocks.

4. Device as claimed in claim 1, wherein the control means (20) are arranged for retrieving control information from the record carrier, the control information comprising recorded area management information indicative of parameters to be recorded for managing the mapping area.

5. Device as claimed in claim 1, wherein the preformed position information is encoded in address frames having a frame length, and the unit length is substantially equal to the frame length.

6. Device as claimed in claim 1, wherein the positions for recording the information blocks have consecutive addresses, and the detecting means (32) comprise means for detecting the highest written address by detecting the highest written region from the mapping area and then detecting the highest written address by detecting the presence of marks on several positions within the highest written region according to a systematic search, in particular a logarithmic search.

7. Device as claimed in claim 1, wherein the control means (20) comprise means for incrementally recording table of contents information in a TOC zone on the record carrier, which incrementally recording starts at the beginning address of the TOC zone, and wherein the mapping means (31) are arranged for recording the mapping area within the TOC zone from the end address of the TOC zone.

8. Device as claimed in claim 7, wherein the detecting means (32) comprise calculation means for calculating the start address of the region containing the highest written address PSN by $$PSN = (E\_TOC - L\_MAP) * (R\_SIZE / U\_LEN) + S\_RECA$$

$E\_TOC$ being the end address of the TOC zone, $L\_MAP$ being the address of the lowest written unit location in the mapping area, $R\_SIZE$ being the size of each region, $U\_LEN$ being the unit length of the random signal unit, $S\_RECA$ being the start address of the first region in the recordable area.

9. Method of recording at least one information block in track in a recordable area on a record carrier, which information block comprises data words and error correction words for correcting errors within the information block, and which track has preformed position information indicative of positions for recording the information blocks, which method comprises recording marks representing the information blocks and recording and retrieving position data indicative of the position of the recorded information blocks, characterized in that the method comprises determining in which region the information block is recorded, the region being one of a number of consecutive regions constituting the recordable area, and recording a random signal unit in a unit location in a mapping area of the record carrier, the unit location in the mapping area being indicative of said region, and the unit length of the random signal unit being substantially smaller than the length of said information block, and retrieving from said mapping area if a region contains at least one information block by detecting the presence of the recorded random signal units.

10. Record carrier comprising a track (9) in a recordable area for recording at least one information block, which information block comprises data words and error correction words for correcting errors within the information block, and which track (9) has preformed position information indicative of positions for recording the information blocks and preformed control information for controlling the recording process, characterized in that the control information comprises recorded area management information indicative of parameters to be recorded for managing a mapping area indicating in which regions information blocks are recorded, the region being one of a number of consecutive regions constituting the recordable area, the mapping area having unit locations for recording random signal units, the unit location in the mapping area being indicative of said region, and the unit length of the random signal unit being substantially smaller than the length of said information block.

* * * * *